No. 876,016. PATENTED JAN. 7, 1908.
G. R. RICH.
DRILL CHUCK.
APPLICATION FILED APR. 22, 1907.
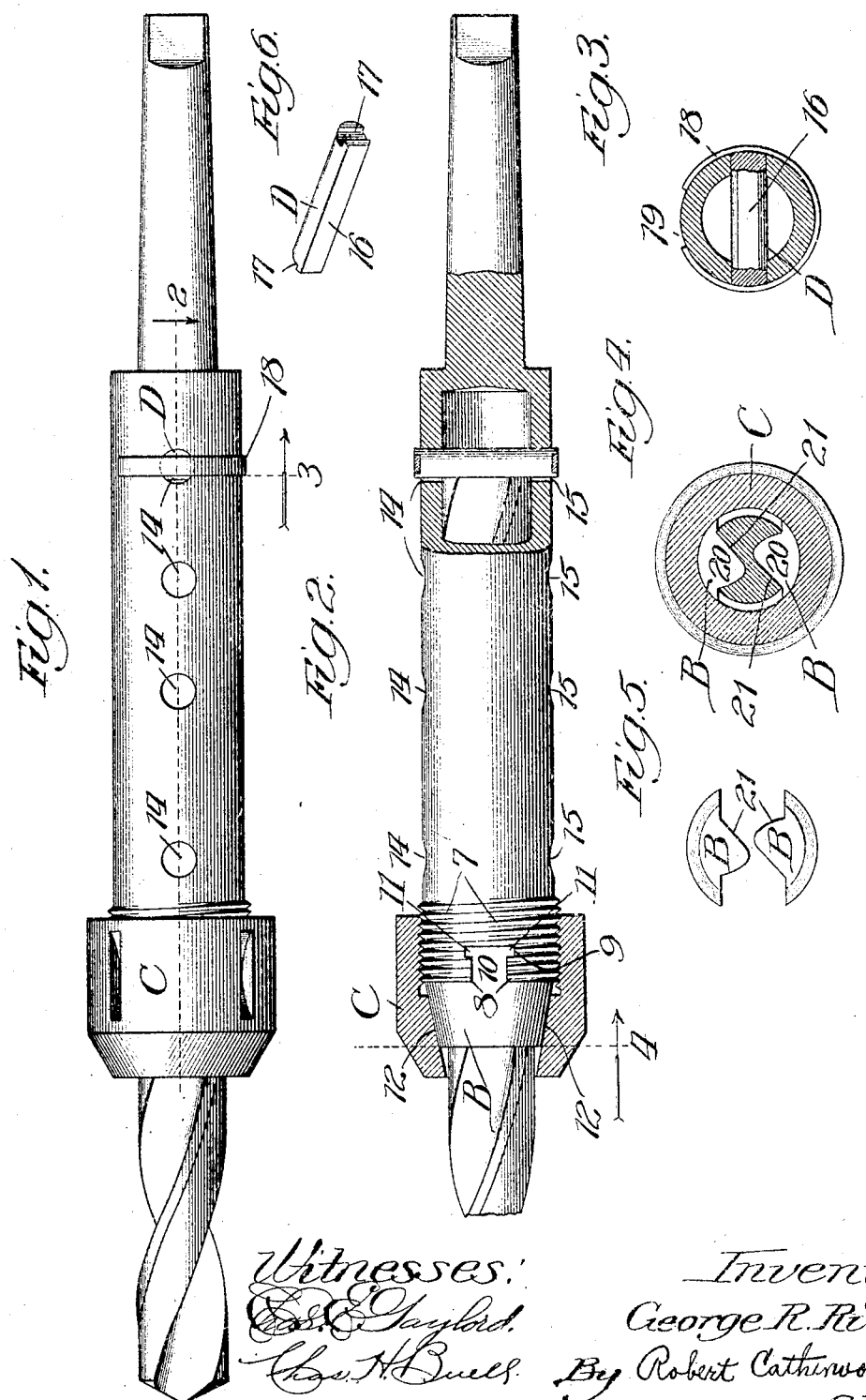

UNITED STATES PATENT OFFICE.

GEORGE R. RICH, OF CHICAGO, ILLINOIS, ASSIGNOR TO THE WHITMAN & BARNES MANUFACTURING COMPANY, OF AKRON, OHIO, A CORPORATION OF OHIO.

DRILL-CHUCK.

No. 876,016.  Specification of Letters Patent.  Patented Jan. 7, 1908.

Application filed April 22, 1907. Serial No. 369,618.

*To all whom it may concern:*

Be it known that I, GEORGE R. RICH, a citizen of the United States, residing at Chicago, in the county of Cook and State of Illinois, have invented certain new and useful Improvements in Drill-Chucks, of which the following is a specification.

My invention relates to improvements in drill chucks, and its object is to provide an economical, efficient and simple device adapted to firmly grasp or interlock with the spirals of drills, having capacity for ready adjustment, increased strength, accuracy of hold upon the drill and speed in cutting or reaming out holes in the metal.

The invention contemplates obtaining a lock grip upon the spirals themselves, thus dispensing with the necessity of providing the drill with a shank or special gripping surface and making it possible to mill out throughout its entire length, so that nearly all of it is ultimately available for cutting purposes.

The invention is adapted for use with different sizes of drills having approximately similar mill gages.

It further consists in certain novel features of construction illustrated in the drawings and described in the specification.

In the drawings, I have shown a drill chuck and twist drill embodying my invention in a preferred form. Figure 1 is a side elevation; Fig. 2 is a view taken on line 2 of Fig. 1 showing certain parts broken away at the end of the chuck to reveal the means of attaching the jaws and locking and unlocking them, and the end thrust stop bar adjustment; Fig. 3 is a section taken on line 3 of Fig. 1; Fig. 4 is a sectional view taken on line 4 of Fig. 2; Fig. 5 is a sectional view through the jaws illustrating the similarly curved inner surfaces or faces of the jaws; and Fig. 6 is a view in perspective of my preferred form of adjustable stop bar.

A indicates the hollow chuck body with an interior bore large enough to receive a drill. One end of the body A is provided with external screw thread surface 7, cut away to provide a transverse groove 8 which is undercut at its upper end at 9. Two jaws B, B, hereinafter more particularly described, each having an upward projection 10 with lugs 11 on the top outer corners to engage the undercut portions 9, fit into the groove 8 where they hang in the chuck body, while the outer surfaces of each are made cone shaped tapering from top to bottom. A cap C, interiorly threaded to intermesh with the threads 7, is adapted to fit over the jaws, screw onto the chuck body and engage the cone surface indicated by 12 so as to force the jaws together upon the drill. The arrangement is such that when the cap is screwed in one direction the jaws are unlocked and may be forced apart, the lugs 11 sliding in grooves 8, thus permitting the drill to be removed, and when screwed in the other direction will lock the drill in position. This construction also permits entire removal of the cap C from the body A and withdrawal of the jaws from the lugs when it is desirable to take the device apart.

In order to limit the distance which the drill may be thrust into the bore of the body A, adjust the device so that the jaws grip it near the cutting end and to provide a supporting surface for the end thrust during the cutting opeartion, I provide a stop bar D and cut through opposite sides of the chuck body from the interior to the exterior any desired number of registering pairs of orifices 14, 15, so that the stop bar may be thrust across the interior bore of the chuck body, through any one of these pairs. The side of this bar nearest the cutting end of the chuck is flattened to provide the square impacting surfaces 16 against which the flat end of the drill rests. I prefer to provide in each end of this bar guides or grooves 17, the edges of which when in position in any one of the pairs of openings 14, 15, project slightly from the exterior surface of the chuck body A.

In order that the stop bar D may be held in place, I provide the curved spring 18 adapted to tightly embrace the outer surface of the chuck body A and to fit into the grooves 17. This spring is cut away at 19 to provide an opening so that when it is slipped around to bring opening 19 over one of the ends 17 the stop bar D can be removed from one pair of openings 14, 15, and thereafter placed in another pair of openings 14, 15, and the spring slipped over it. In this manner the position of the drill in the chuck is regulated, and it is given end thrust support.

One of the important features of my invention is particularly illustrated in Figs. 4 and 5, wherein the similarly curved inner surfaces 21, 21, of the jaws B, B, are shown. These curves are laid out with reference to the mill gage 20 of the spirals of the drill, and are adapted to fit closely on opposite sides of the spiral, and when brought together to grasp it firmly. Any of the standard size drills may be used having approximately the same mill gage, and it will be apparent that by providing a set of jaws, each having a different curved inner surface, that drills having entirely different mill gages may be used with my chuck by substituting one set of jaws for another in accordance with the different gages.

The operation of my device is as follows: The drill to be used is inserted in the chuck body A and its position is determined by thrusting the bar D through the openings 14, 15, and locking it in place by means of the spring 18. Jaws B, B, are inserted in the grooves or recesses 8 where they hang by the lugs 11 on the projection 10 in the undercut 9. The cap C is then screwed onto the thread 7, its inner side rides upon the cone surfaces 12, 12, of the jaws B, B, drawing them together and causing the simliarly curved inner surfaces 21, 21, to mesh into the spiral mill gage 20 gradually locking the drill in position. I prefer to construct my chuck of steel.

I am aware that many modifications of the specific form of chuck I have shown will suggest themselves to those skilled in the art, and I do not wish to be understood as limiting myself to it, but

What I claim and desire to secure by Letters Patent is:

1. In a drill chuck, a hollow chuck body provided with oppositely disposed registering openings from the interior to the exterior thereof, a stop bar adapted to be thrust across said hollow interior through said registering openings, and having guide ways on its ends and a spring curved to embrace the exterior of said chuck body and adapted alternately to be slipped in and out of said guide-ways to lock and unlock said stop in place.

2. In a drill chuck, a cylindrical chuck body provided with oppositely disposed registering openings from the interior to the exterior thereof, a stop bar having guides in its ends adapted to be thrust lengthwise across said hollow interior and project through said registering openings, and a curved spring adapted to embrace the exterior of said chuck body and fit into said guides, whereby said stop bar may be alternately locked and unlocked.

In testimony whereof I hereunto affix my signature in presence of two witnesses.

GEORGE R. RICH.

Witnesses:
CHARLES L. HINE,
ARTHUR GREENE.